Sept. 12, 1961    M. COTTINGHAM ET AL    2,999,469
HAND SUPPORTED DOUGHNUT MACHINE
Filed Sept. 25, 1958    2 Sheets-Sheet 2

INVENTORS
MORRISON COTTINGHAM &
GALEN E. FORSYTH.
BY *Victor J. Evans & Co.*
ATTORNEYS

United States Patent Office 2,999,469
Patented Sept. 12, 1961

2,999,469
HAND SUPPORTED DOUGHNUT MACHINE
Morrison Cottingham, Oklahoma City, Okla. (814 S. University Ave., Little Rock, Ark.), and Galen E. Forsyth, 1914 E. 5th, Little Rock, Ark.
Filed Sept. 25, 1958, Ser. No. 763,217
4 Claims. (Cl. 107—14)

This invention relates to doughnut making machines, and in particular a funnel-shaped dough retaining hopper having a depending neck in which dough is extruded from the hopper through the neck in rings with a sufficient quantity of dough in each ring to form a doughnut.

The purpose of this invention is to provide a mechanically actuated doughnut machine that is so constructed that it may be held by the hands of an operator as doughnuts are extruded therefrom.

Various types of doughnut making machines have been provided and some of these machines use funnel-shaped hoppers with cam actuated plungers for forcing dough through necks of the hoppers in rings, however, substantially all hoppers of doughnut machines of this type are mounted on a stand and the dough is dropped directly into hot oil, fat, or the like at one side of the stand. With machines of this type it is sometimes difficult to prevent one doughnut dropping upon another.

With this thought in mind this invention contemplates a hand supported doughnut making machine in which the machine is completely suspended by hand so that it may readily be moved from one position to another.

The object of this invention is, therefore, to provide a doughnut making machine that is adapted to be held by the hands of an operator.

Another object of the invention is to provide a doughnut making machine designed to be held by the hands of an operator in which rings of dough for forming doughnuts are readily dispensed from the hopper.

A further object of the invention is to provide a doughnut machine having a combination of a motor actuated plunger with a spring controlled plunger whereby downward movement of one plunger forces the other plunger away from the end of the spout of the machine a sufficient distance to permit a ring of dough, capable of forming a doughnut, to be extruded from the machine.

A still further object is to provide a doughnut making machine designed to be held in the hands of an operator and having a motor actuated plunger in combination with the dough actuated plunger in which the machine is of a simple and economical construction.

With these and other objects and advantages in view the invention embodies a funnel-shaped hopper having an open upper end with a neck depending from the lower end, a spring actuated plunger positioned against the lower end of the neck and held by a vertically disposed stem with springs thereon for urging the plunger against the end of the neck, and a motor actuated plunger positioned to coact with the former plunger for extruding rings of dough for making doughnuts, from the neck at the lower end of the hopper.

Other features and advantages of the invention will appear from the following description taken in connection with the drawings, wherein:

FIGURE 4 is a cross section through one end of the motor housing showing the reduction gears therein.

FIGURE 6 is a sectional plan taken on line 6—6 of FIGURE 1 with the parts shown on an enlarged scale showing a portion of the motor mounting wherein the motor is readily removable from the hopper to facilitate cleaning.

Figure 1:
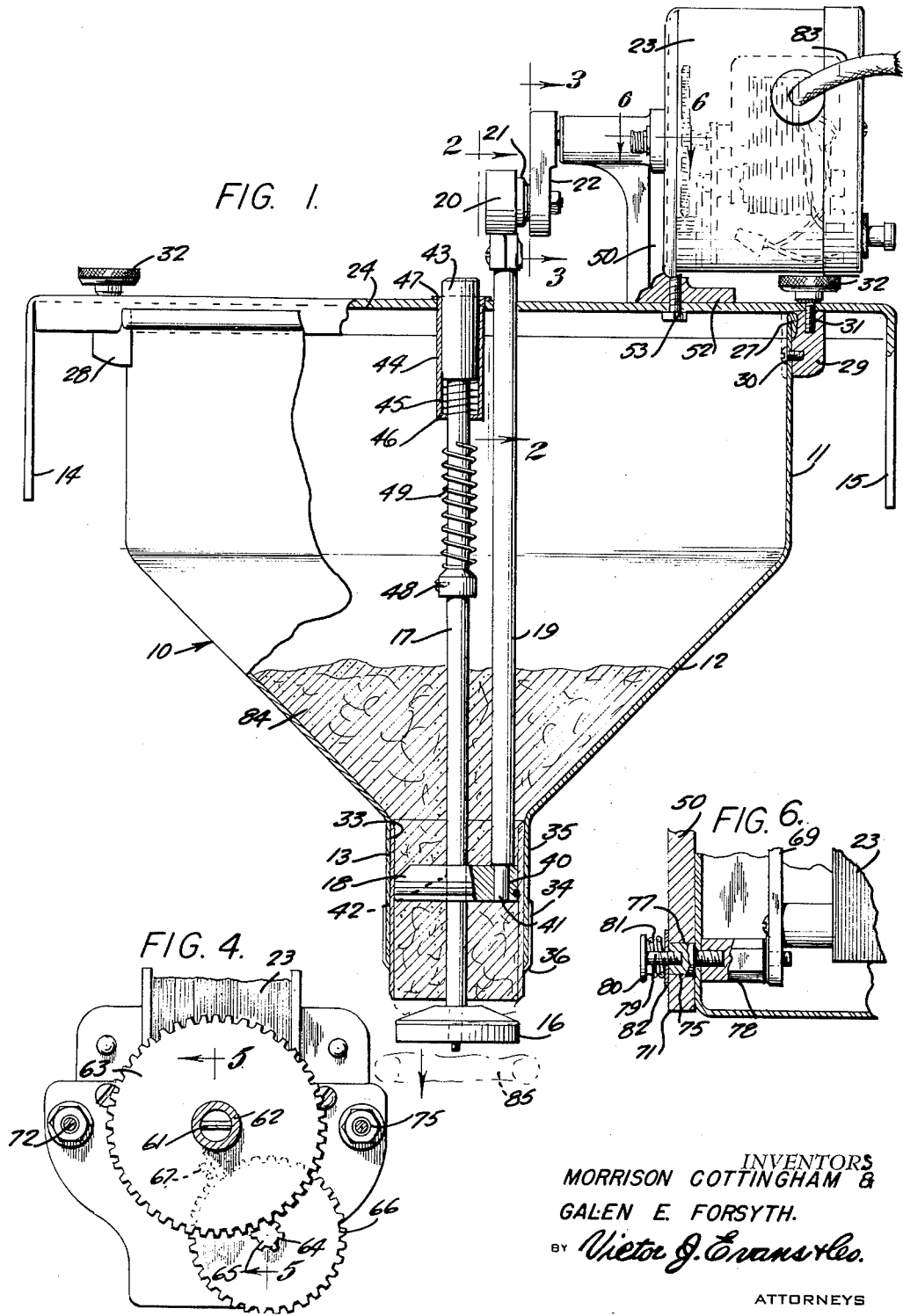
FIGURE 1 is a side elevational view of the hand supported doughnut making machine with parts broken away and with parts shown in section, the plungers of the machine being in positions for extruding a ring of dough through the lower end of the spout or neck of the hopper and showing another ring of dough extruded from the hopper in broken lines.

Referring now to the drawings wherein like reference characters denote corresponding parts the improved motor actuated hand machine of this invention includes a hopper 10, preferably shaped in the form of a funnel having a cylindrical upper section 11, a frusto-conical shaped intermediate section 12 and a neck 13, and having handles 14 and 15 positioned at opposite sides, a lower plunger 16 carried by a stem 17 positioned to provide a closure for the lower end of the neck, an upper plunger 18 carried by a rod 19 having a cam 20 on the upper end and positioned to coact with a roller 21 on an eccentric arm 22 and actuated by a motor 23.

The handles 14 and 15 of the hopper 10 are formed by extensions of a web 24 of a bar, channel-shaped in cross section, having flanges 25 and 26 at the sides and the channel bar is clamped to a rim 27 on the upper edge of the cylindrical section 11 of the hopper by clamps 28 and 29 which are secured to the hopper by screws 30, and which are secured to the channel bar by screws 31 having knurled heads 32 providing thumb screws.

In the design shown the neck 13 includes an inner sleeve 33 having a band 34 extended around the outer surface and the lower portion of the hopper extended from the section 12 and forming a cylindrical section 35 extends into the upper portion of the band 34 providing a reinforced neck. The lower edge of the band 34 is secured to the outer surface of the sleeve 33 by welding or the like such as shown at the point 36. It will be understood, however, that the neck may be formed by other means.

Figure 2:
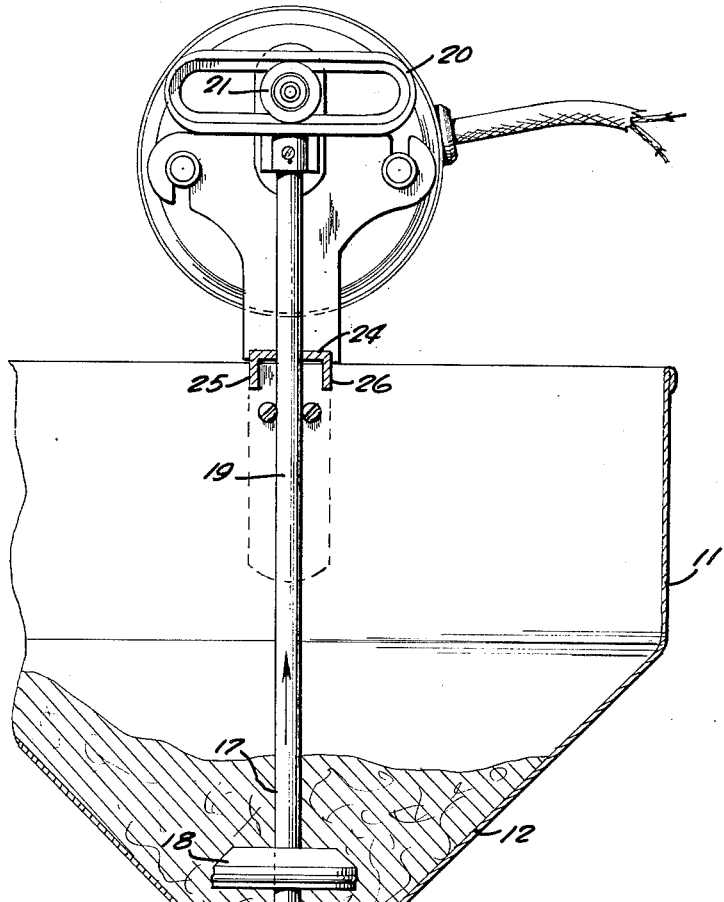
FIGURE 2 is a sectional elevational view of the machine showing the machine with the lower plunger in position for closing the lower end of the neck or spout of the hopper, the section being taken on line 2—2 of FIGURE 1.
Figure 3:
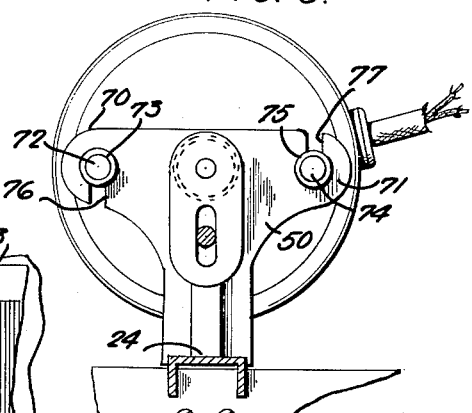
FIGURE 3 is a cross section through the operating mechanism of the machine taken on line 3—3 of FIGURE 1 showing a connection of a roller carrying arm to the motor and support.

The plunger 16 is provided with a threaded opening 37 that receives a threaded stud 38 on the lower end of the stem 17 and, as shown in FIGURE 2, the lower plunger 16 is secured against a shoulder 39 at the lower end of the stem.

The upper plunger 18 is provided with an opening 40 in which a stud 41 on the lower end of the rod 19 is secured, such as by brazing or welding and the plunger 18 is also provided with an opening 42 through which the stem 17 of the lower plunger 16 extends. The stem 17 is free to slide in the opening 42 so that the plunger may be operated independently.

The upper end of the stem 17 is secured, such as by welding, to a button 43 slidably mounted in a sleeve 44 and urged upwardly by a spring 45 between the lower end of the button 43 and a flange 46 in the lower end of the sleeve whereby upon downward movement of the plunger 18 the dough between the two plungers urges the lower plunger 16 downwardly, to the position shown in FIGURE 1, compressing the spring 45 and in the return movement of the plunger 18 the spring 45 draws the plunger 16 upwardly into the lower end of the neck 13, as shown in FIGURE 2. The upper end of the sleeve 44 is provided with a flange 47 that is positioned in the web 24 of the bar or beam extended across the upper end of the hopper. The intermediate part of the stem 17 is provided with a collar, such as the collar 48 secured thereon by a set screw and a spring 49 extended around the stem 17 and positioned between the set collar 48 and the flange 46 at the lower end of the sleeve 44 restricts upward movement of the stem 17 and plunger 16 and facilitates downward movement of the plunger.

The mounting beam including the web 24 with the flanges 25 and 26 is provided with a bracket 50 having a hub 51 on the upper end and a flange 52 extended from the lower end and, as shown in FIGURE 1 the bracket is secured to the cross bar or beam by a cap screw 53 extended through the web 24 and threaded into the flange or base of the bracket.

Figure 5:
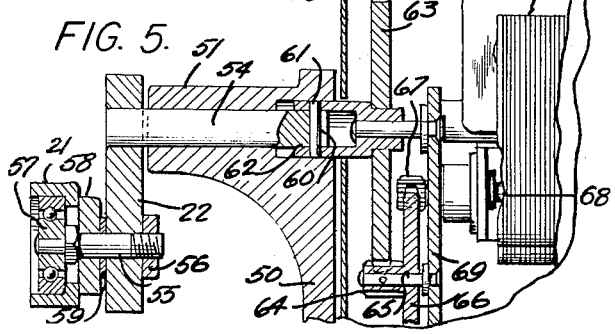
FIGURE 5 is a sectional view through the motor housing and reduction gear mounting taken on line 5—5 of FIGURE 4.

The hub 51 of the bracket 50 is provided with a shaft 54 on the outer end of which the eccentric arm 22 is fixedly mounted and, as illustrated in FIGURE 5, the arm 22 is provided with a stud bolt 55 that is secured in the arm by a lock nut 56. The extended end of the stud is provided with a ball bearing 57 on which the roller 21 is mounted. The roller 21 is spaced from the eccentric arm 22 by a spacing disc 58 and a sealing washer 59 is provided between the disc 58 and arm. By this means the roller is mounted to travel in the cam loop 20 actuating the upper plunger 18 with a reciprocating action.

The inner end of the shaft 54 of the bracket 50 is provided with a slot 60 and the slot is positioned to receive a pin 61 mounted in a sleeve 62 on the opposite end of which a gear 63 is positioned. The gear 63 is positioned to mesh with a pinion 64 on a shaft 65 and the shaft is provided with a gear 66 that is positioned in meshing relation with a pinion 67 on a shaft 68 of the motor 23. The shafts 65 and 68 are rotatably mounted in a bearing plate 69 positioned in the motor housing.

The bracket 50 which is mounted on the web 24 of the cross beam by the bolt 53 is provided with wings 70 and 71, the wing 70 having an opening 72 for a stud 73 therein and the wing 71 having an opening 74 for a stud 75. The wing 70 is provided with a downwardly disposed slot 76 whereas the wing 71 is provided with an upwardly disposed slot 77. The slots are positioned to permit the motor to rotate in relation to the bracket to facilitate mounting and removing the motor therefrom.

To facilitate attaching and removing the motor the studs 73 and 75 are formed as illustrated in FIGURE 6 wherein the stud 75 is positioned in a slot 77 of the wing 71 of the bracket 50 and the stud 75 is threaded into a post 78 extended from the bracket 69 positioned between the motor and bracket 50. The stud 75 is provided with a screw 79 having a knurled head 80 and a spring 81 positioned around the screw 79 urges a washer 82 against the surface of the bracket 50 and retains the screw in tension whereby unscrewing thereof is substantially obviated.

An electric cord 83 extends from the motor to a suitable source for supplying electric current.

With the hopper 10 containing dough, as indicated by the numeral 84 and positioned with the handles 14 and 15 held in the hands of an operator the motor is started whereby the upper plunger 18 is reciprocated and with downward movement of the upper plunger 18 the lower plunger 16 moves away from the lower end of the neck or spout of the hopper whereby a ball of dough is extruded beyond the periphery of the neck 13. Then upon upward movement of the upper plunger 18 the lower plunger 16 will coact with the lower edge of the neck 13 to cut a hole in the ball of dough and thus form a ring of dough as indicated by the dotted lines 85, and similar rings may be dropped over an area in a pot containing hot oil or fat whereby doughnuts may be dropped into open spaces by the operator.

It will be understood that modifications, within the scope of the appended claims, may be made in the design and arrangement of the parts without departing from the spirit of the invention.

What is claimed is:

1. A hand supported machine for forming doughnuts comprising a funnel-shaped hopper having a cylindrical neck depending from the lower end thereof, a cross beam extended transversely of said hopper and removably secured to the upper peripheral edge thereof, a sleeve secured to said cross beam centrally thereof, a button slidably mounted in said sleeve, a stem secured to said button and extending downwardly into said hopper, a lower plunger mounted on the lower end of the stem in the lower end of the neck, resilient means positioned in said sleeve in circumjacent relation to said stem and engaging said button for urging the lower plunger into position for closing the lower end of the neck, a collar on the intermediate portion of said stem, a spring on said stem in circumjacent relation thereto for engaging said collar and the lower end of said sleeve for limiting upward movement of said stem, an upper plunger slidably mounted in said neck, a substantially triangular shaped bracket having a flange on the lower end thereof that is secured to said cross beam, a motor removably mounted on the bracket and operatively connected to the upper plunger for vertical reciprocation thereof, whereby upon downward movement of said upper plunger the dough between said upper plunger and said lower plunger will be compressed and force the lower plunger downwardly to permit the escape of the dough at the lower end of the neck and upon upward movement of said upper plunger said resilient means will force said lower plunger upwardly to its initial position thereby severing the dough at the lower end of the neck to form a dough ring and handles extended from sides of the hopper.

2. A hand supported machine as in claim 1 wherein said bracket is provided with the reversely positioned slots in the opposite ends thereof and said motor is provided with parallel disposed spaced studs thereon that are adapted to be received in said slots for removably mounting said motor on said bracket, a rod connected to said upper plunger, a cam on the upper end of said rod, an eccentric arm connected to said motor and a roller on said eccentric arm cooperating with the cam on said rod for reciprocating said rod and the upper plunger thereon.

3. In a hand supported machine for forming doughnuts, the combination which comprises a hopper having a cylindrical upper section, a frusto-conical shaped intermediate section and a cylindrical neck depending from the lower end of the frusto-conical shaped section, a bar, channel-shaped in cross section extended across the upper end of the hopper and clamped to opposite edges thereof, a lower plunger positioned in the lower end of the neck, a stem extended from the lower plunger to a button slidably mounted in the cross bar on the upper end of the hopper, a spring on the stem mounted to urge the lower plunger upwardly to close the lower end of the neck, an upper plunger slidably mounted on said stem and disposed at an initial position in the intermediate hopper section, a vertically disposed rod secured to and extended upwardly from the upper plunger, a horizontally disposed loop-shaped cam on the upper end of the rod extended from the upper plunger, a substantially triangular shaped bracket having a flange on the lower end thereof that is mounted on the cross bar, said bracket having reversely positioned slots in the opposite ends thereof, a shaft rotatably mounted in the upper end of said bracket intermediate of the slots therein, an eccentric arm mounted on an end of the shaft extended from the end of the bracket toward the center of the hopper, a roller carried by the eccentric arm and positioned in the cam loop on the upper end of the rod, a motor having parallel spaced studs thereon that are mounted in the slots in the bracket that is mounted on the cross bar, and means operatively connecting the motor to the shaft rotatably mounted in the upper end of the bracket whereby reciprocation of the upper plunger is provided through the coaction of the roller on the eccentric arm with the cam loop, so that upon downward movement of said upper plunger the dough therebeneath will be trapped in said neck as said upper plunger descends and enters same, and the dough so trapped between said upper plunger and said lower plunger will be compressed and force the lower plunger downwardly to permit the escape of dough at the lower end of the neck and upon upward movement of said upper plunger said spring will force said lower plunger upwardly to its initial position in engagement with the lower end of the neck thereby severing the dough at the lower end of the neck to form a dough ring.

4. In a hand supported machine for forming doughnuts as in claim 3 wherein a reduction gear is provided for operatively connecting the motor to the shaft rotatably mounted in the bracket for rotating the shaft and actuating the eccentric arm and cam to reciprocate the upper plunger.

References Cited in the file of this patent

UNITED STATES PATENTS

| | | |
|---|---|---|
| 2,669,949 | Cottingham | Feb. 23, 1954 |
| 2,797,652 | Waddell | July 2, 1957 |
| 2,881,716 | Belshaw | Apr. 14, 1959 |